United States Patent

Hughes et al.

[15] 3,641,323
[45] Feb. 8, 1972

[54] SPEED ALTITUDE COMMAND SYSTEM FOR AERIAL VEHICLES

[72] Inventors: Roland O. Hughes, Inglewood; Joseph H. Allen, San Pedro, both of Calif.

[73] Assignee: North American Rockwell Corporation, El Segundo, Calif.

[22] Filed: Dec. 31, 1969

[21] Appl. No.: 889,448

[52] U.S. Cl. .....................235/150.2, 244/77 D, 235/150.22
[51] Int. Cl. ..........................................G06g 7/70, G06g 7/78
[58] Field of Search ................235/150.2, 150.21; 244/77 D

[56] References Cited

UNITED STATES PATENTS

| | | | |
|---|---|---|---|
| 2,701,111 | 2/1955 | Schuck | 235/150.21 X |
| 3,171,617 | 3/1965 | Larson et al. | 235/150.2 X |
| 3,276,255 | 10/1966 | Hattendorf | 244/77 D X |
| 3,322,375 | 5/1967 | Larson | 244/77 D |

*Primary Examiner*—Eugene G. Botz
*Assistant Examiner*—R. Stephen Dildine, Jr.
*Attorney*—L. Lee Humphries

[57] ABSTRACT

An electronic system which senses a plurality of variables during flight of an aerial vehicle and computes therefrom control parameters, presenting the computed parameters from continuous comparison with a predetermined maximum efficiency profile, displaying the error to the pilot or transmitting the error to an aircraft autopilot.

11 Claims, 3 Drawing Figures

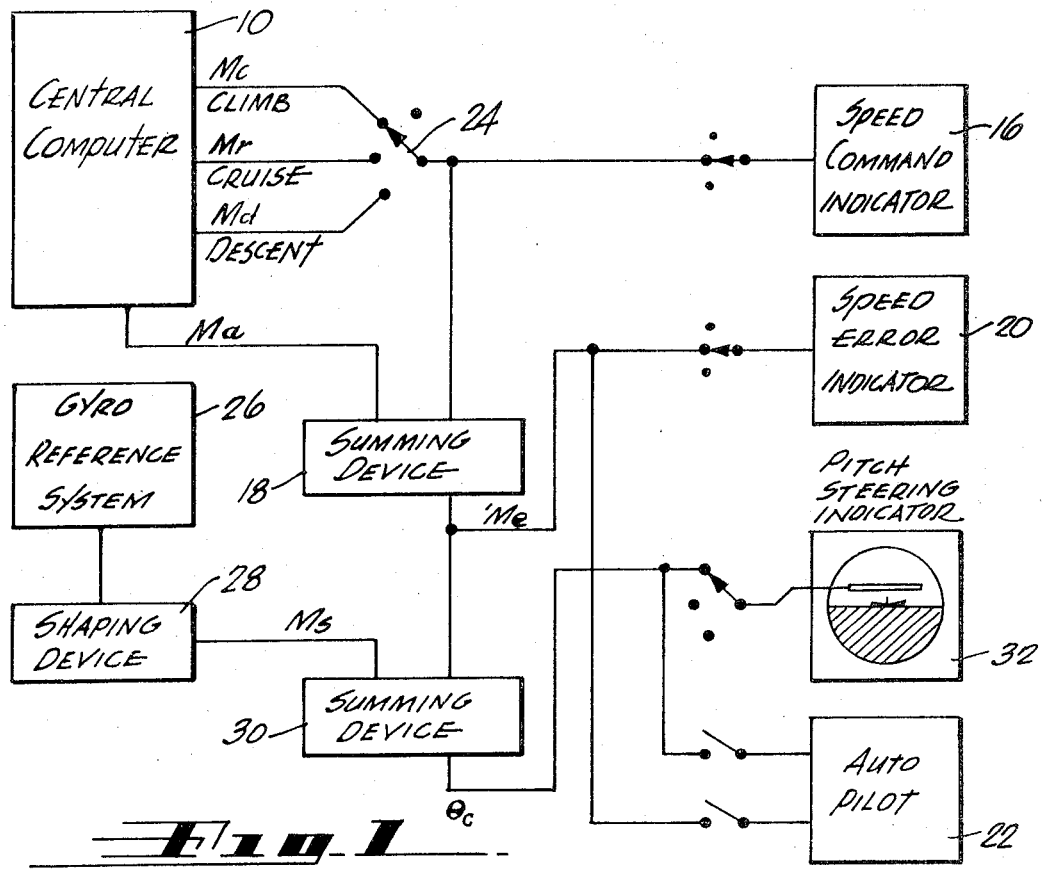
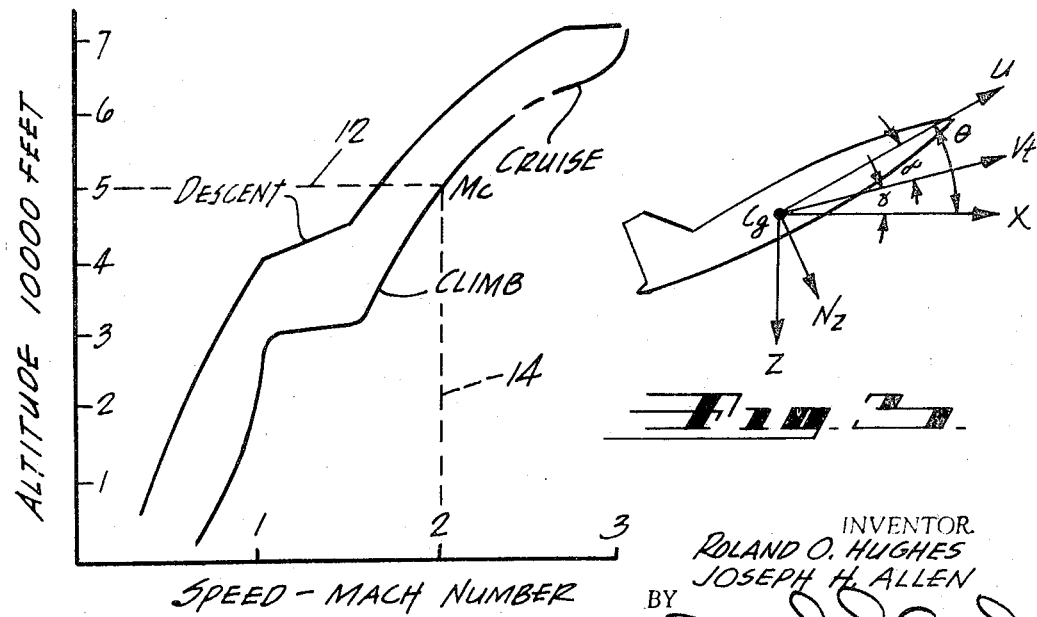

3,641,323

SPEED ALTITUDE COMMAND SYSTEM FOR AERIAL VEHICLES

BACKGROUND OF THE INVENTION

High-performance aircraft such as supersonic transports, bombers, and the like, are designed for optimum performance at a particular cruising speed and altitude. The combined set of operating conditions which determine the optimum performance for the aircraft are frequently referred to as the design point. The design point is usually characterized by maximum efficiency in the use of fuel, in other words, maximum cargo weight-speed-distance achieved per pound of fuel consumed. The maximum efficiency is determined primarily by the aerodynamic characteristics of the aircraft wing and the total power/weight ratio. When operating at any other condition than the design point, the vehicle used fuel at a higher rate than that identified with optimum performance efficiency.

During transient operational modes such as the climb and descent portions of flight, failure to coordinate accurately between the various control parameters of the aircraft results in fuel wastage. To achieve the best possible performance in regard to use of available fuel, the control parameters must be continuously coordinated. The climbing mode in a large and heavy high-speed aerial vehicle involves continuous and rapid changes of control parameters such as air speed, rate of climb, altitude, temperature, and Mach Number values. In a typical case, such as a supersonic transport, the climbing mode alone can consume about one-half of the total fuel load in order to reach the design cruise speed and altitude. Any errors in pitch angle during this critical period of flight may severely compromise the margin of safety of the entire flight with respect to fuel remaining at the destination necessary for a normal landing.

The mathematical analysis of the control problem during the climbing mode of vehicle operation is extremely complex and beyond the response capabilities of any human operator. Normal reaction time is slower than the rate at which the various changes of flight conditions occur. It would therefore be desirous to employ a command steering system which would command the pilot or autopilot to make a specific change to maintain the aircraft on the maximum efficiency profile. Use of a command steering system will substantially reduce the pilot workload and permit pilot concentration on other cockpit duties.

The prior art includes devices of many different types for sensing and displaying data useful in guiding the flight path of aircraft, such as landing profiles and cross-country navigational flight plans. Illustrative of known landing phase systems are the teachings of U.S. Pat. Nos. 3,052,427, 3,077,557, and 3,031,662. Illustrative of navigational control systems is that shown in U.S. Pat. No. 2,541,277. Illustrative of flight profile control systems for anticipating fuel shortages due to unplanned deviations in a flight schedule is the system shown in U.S. Pat. No. 3,088,669. Control indicating systems for use particularly during takeoff and climb are shown in U.S. Pat. Nos. 3,265,334 and 3,313,152.

SUMMARY OF INVENTION

This invention comprises an electronic system capable of sensing a plurality of variables during high-speed flight, computing actual vehicle speed and pitch angle, and presenting the two stated parameters for comparison with a predetermined speed-altitude profile continuously during vehicle operation to insure maximum overall efficiency and safety throughout an entire flight. Climb, cruise, and descent profiles are stored in a computer, compared with actual flight conditions as determined from the sensed variables, and any incongruities therebetween, representing control errors, are displayed visually to a pilot or fed as electrical signals to an autopilot. In addition to the foregoing, certain "anticipation information" such as atmospheric disturbances or conditions ahead of the actual flight location, is collected by the sensing means mentioned above. The anticipation signal representing such information is combined with the error signal described above and used to control the flight path and altitude of the air vehicle to conform the same to the prescheduled speed and altitude profile.

BRIEF DESCRIPTION OF THE DRAWING

FIG. 1 shows a block diagram schematic of an illustrative circuit embodying the inventive concept;

FIG. 2 shows a climb, cruise, and descent profile of typical shape for a given aerial vehicle representing optimum performance of the vehicle through speed and altitude control which is providable by the circuitry of FIG. 1; and FIG. 3 is a schematic view of an aerial vehicle in flight to show certain angular representations thereof for purposes of mathematical analysis.

DETAILED DESCRIPTION OF THE SHOWN EMBODIMENT

Referring particularly to the drawing, there is shown in FIG. 2 a climb, cruise and descent profile which is to be employed in conjunction with the apparatus shown in FIG. 1. The climb, cruise, and descent profile graphically denotes the particular combination of altitude and speed (or Mach Number) representing the path of maximum operating efficiency for the aircraft. The profile for each aircraft will be different. Each profile for each aircraft depends upon many variables such as the air speed, the weight of the aircraft, the range of flight, fuel quantity, the time of the flight, the temperature of the ambient air in which the air vehicle primarily flies, the thrust of the engines, the throttle functions, et cetera. However, for a particular type of aircraft such as a supersonic aircraft a basic type of standard profile is known. This standard type of profile is to be modified for each flight of the craft according to the range of the flight and the weight to be carried, which are normal factors varying with each flight. Because it has been found that it is physically impossible for the pilot of a supersonic aircraft to maintain operation of the craft along its maximum efficiency profile during the different flight modes, the employment of an electronic apparatus to sense the flight conditions and suggest a course of action for the pilot has been found to be necessary. Such an apparatus is shown in FIG. 1 of the drawing.

Referring particularly to FIG. 1, the speed altitude command system disclosed herein comprises a grouping of subcombination elements, each of which is individually known in the prior art and normally found in large aerial vehicles. No claim of invention in this application is based upon the details of the subcombination elements. It is to be understood that this invention relates to a relationship between the subcombination elements not heretofore known. In FIG. 1 a central computer 10 is shown of any suitable type which is to provide output signals, electrically or mechanically. Basically the central computer 10 computes mathematically certain specific aircraft parameters of functions of these parameters. Typical parameters are vehicle speed, altitude, dynamic pressure and so forth with functions of these parameters being such as the time rate of change of air vehicle speed, altitude and dynamic pressure. Central computer 10 is to receive a plurality of signals obtained from various sensing devices representing air vehicle speed, altitude, dynamic pressure and the like. Such sensing means may include the altitude sensing system of U.S. Pat. No. 3,209,593 and the speed-sensing means of U.S. Pat. No. 3,104,546, although many other such devices could be used to practice the inventive concept of this invention.

The central computer 10 is to be programmed with the profile of FIG. 2 or any other profile representing optimum performance for the particular aerial vehicle. As previously stated, in actual practice, several profiles will probably be programmed and the desired profile selected for the particular flight. The method of programming may be any of the conventional programming methods, such as digital data storage, shaft-driven-shaped cam, special wound or padded potentiometer, and switching circuits. In operation the central computer 10 senses actual vehicle altitude and provides an output signal proportional to the programmed vehicle speed translated into Mach Number according to the desired profile. For example, with the aircraft in the climb mode, if the actual vehicle altitude was 5,000 feet, this altitude reading would be compared to the programmed profile of FIG. 2. To illustrate the comparison, the horizontal broken line 12 in FIG. 2 is drawn from the 50,000 foot altitude level until line 12 intersects with the portion of the profile curve labeled climb. The point of intersection is designated $M_c$. By drawing a second line 14 from $M_c$ and at a right angle to broken line 12, the desired speed, which is represented by Mach Number, at which the aircraft would be operating at maximum efficiency would be a Mach Number of 2.0. The signal designated $M_c$ is to be transmitted from the central computer 10 to a speed command indicator 16.

The speed command indicator 16 is a device in common use in aircraft to display actual aircraft speed to the pilot with the secondary function of displaying desired aircraft speed. This secondary function would be utilized by the concept of this invention and this type of device is well known to those skilled in the art and is not specifically a part of this invention. The central computer 10 is to also provide an additional output signal designated $M_a$ representing the actual speed of the aerial vehicle as determined from the sensed parameters discussed above and translated into Mach Number. The signal $M_a$ is to be transmitted to a summing device 18 with the construction of summing device 18 being well known. The summing device 18 is to perform the function of adding quantities algebraically. Such summing devices assume the form of a difference amplifier or a transformer. A signal $M_c$ is also fed into the summing means 18 which represents the desired Mach Number. The output signal $M_e$ from the summing device 18 represents the speed error existing between the two values of Mach Numbers $M_c$ and $M_a$. The error signal $M_e$ is transmitted to a speed error indicator 20 which may take any of various known forms and is to perform the function of displaying the speed error in terms of numerical Mach Number values. The speed error indicator 20 may be in the form of an instrument, indicator lights, or other types of display apparatus. In addition, the speed error signal $M_e$ may also be transmitted to an autopilot 22 which is of conventional design and is adapted to actuate automatically various control surfaces on the aerial vehicle to change the speed or pitch angle thereof.

It is to be understood that the central computer 10 continuously transmits signals during the climbing mode of the aircraft with any variation from the optimum performance profile being instantly observed. Upon the aircraft achieving the cruise mode at the desired cruise altitude, the central computer 10 transmits through switching device 24 signals $M_r$ representing the ideal cruise signals for the aircraft. As previously stated the signals are displayed by the speed command indicator 16, and the error displayed by the speed error indicator 20. Upon the aircraft descending into the descent mode, the central computer 10 will transmit in a similar manner the descent mode signals $M_d$ through switching device 24.

Referring again to FIG. 1, a gyro reference system 26 is shown with such a system in itself being well known in the prior art. A gyro reference system is a device which produces signals representing aerial vehicle angles, rate of change of angle, rate and acceleration with respect to a fixed aerial vehicle axis or an inertial earth reference system. The gyro reference system 26 can be designed to provide one of four different signals. The four signals are the earth coordinate axis vertical acceleration, the earth coordinate axis vertical rate, the aerial vehicle pitch angle, or the rate of change of pitch angle from an inertial earth reference system. The particular signal which is provided from the gyro reference system 26 is to be modified as required by shaping device 28. The shaping device 28 is a system of amplifiers used to alter the input signal in amplitude and phase angle as a function of the frequency of the input signal thereby generating what is termed lead or lag of the input signal. This technique is well known in the art and need not be discussed here in detail. Reference may be had to the technique by referring to Automatic Feedback Control System Synthesis, by John G. Truxal, copyrighted 1955, Mc-Graw Hill Book Company. The output signal $M_s$ of the shaping device 28 is added algebraically by summing device 30 to the speed error signal $M_e$. The output of the summing device 30 is denoted as a pitch command signal $\theta_c$. The pitch command signal $\theta_c$ is used to position the pitch steering indicator 32 which in turn directs the pilot to fly "up" or "down" as required to reduce the speed error of the vehicle. Also, the pitch command signal $\theta_c$ may be used as an input to autopilot 22 for an automatic pitch axis control.

A salient feature of this invention is the anticipation information signal provided by the gyro reference system 26 in the form of earth coordinate axis vertical acceleration $\ddot{Z}$ or rate $\dot{Z}$, or as air vehicle pitch angle $\theta$ or rate of change of pitch angle $\dot{\theta}$ from an inertial earth reference system. Any one of these signals will perform the desired function of providing anticipation information. However, the shaping device 28 will vary depending upon which signal is available for use. The specific salient feature of this anticipation information is the fact that all four signals are based on a reference system from the earth. The method which has been heretofore employed is to base the signals on altitude, with the altitude measured by pressure or density. However, since altitude is based on an atmospheric pressure sensing device, it is subject to variation due to abrupt changes in barometric pressure along the flight path caused by temperature, weather, clear air turbulence, et cetera. This previous method is not employed for the subject invention because high altitude and high speed flight experience has determined that atmospheric disturbances are a problem to be expected at all operational altitudes. These disturbances effect air speed, rate of climb, altitude and Mach Number causing transient error in these instrument readings which can be of serious consequence. Normal pilot reaction to these instrument variations has been shown to aggravate the air vehicle disturbance. The subject invention has the inherent ability to minimize control inputs normally associated with barometric pressure variations due to atmospheric disturbances. This advantage is gained by the use of computed vertical air speed from a reference system independent of barometric pressure. The earth based signals avoid the transient errors which are caused by atmospheric disturbances.

The computation of the four earth based signals is as follows: Vertical altitude is a quantity which may be defined as the earths vertical axis distance above sea level. Using this definition let the symbol Z represent the vertical altitude. Vertical speed is the derivative of Z with respect to time and will be represented by the symbol $\dot{Z}$. Vertical acceleration is the second derivative of Z, represented by $\ddot{Z}$. Additional symbol definitions employed in this computation is as follows:

$C_{L_\alpha}$ Lift curve slope
$C_{L_\delta}$ Lift coefficient function of $\delta$ (elevator deflection)
$g$ Gravitational constant
$m$ Air vehicle mass
$N_z$ Normal acceleration
$q$ Dynamic pressure
$S$ Wing area
$s$ Laplace operator
$u$ Air vehicle longitudinal body axis
$V$ Velocity
$V_t$ True Velocity
$x$ Horizontal inertial reference
$z$ Vertical inertial reference
$Z$ Altitude
$\alpha$ Angle of attack
$\gamma$ Flight path elevation angle
$\gamma = \theta - \alpha$ By definition
$\theta$ Pitch angle (·) 1st derivative with respect to time (··) 2nd derivative with respect to time Referring particularly to FIG. 3 of the drawing, a good approximation for normal acceleration, assuming constant velocity and small perturbation angles such that $\sin\gamma \cong \gamma$, is:

$\delta N_z \cong V/g\dot\gamma$     1.

$\delta N_z \cong V/g(\dot\theta - \dot\alpha)$     2.

And also, neglecting unimportant terms:

$N_z \cong qS/mg(C_{L_\alpha}\alpha + C_{L_\delta}\delta)$     3.

$N_z \cong qS/mg\, C_{L_\alpha}\alpha$     4.

Variation due to $\alpha$ only as $C_{L_\delta}\delta$ pertains only to short term effects. Solving for $\alpha$ and differentiating to obtain:

$$\dot\alpha = \frac{\dot N_z}{\dfrac{qSC_{L_\alpha}}{mg}} \quad (5)$$

Rewriting equation (2) in the form:

$\Delta \dot N_z + V/g\dot\alpha = V/g\dot\theta$     6.

And substituting $\dot\alpha$ from equation (5), equation (6) becomes:

$$\Delta \dot N_z + \frac{mV}{qSC_{L_\alpha}}\dot N_z \cong \frac{V}{g}\dot\theta \quad (7)$$

Using Laplace notation $\dot N_z = \Delta N_z s$, equation (7) becomes:

$$\Delta N_z\left(1 + \frac{m}{qSC_{L_\alpha}}s\right) \cong \frac{V}{g}\dot\theta \quad (8)$$

And rewriting equation (8) to solve for $\Delta N_z$ produces:

$$\Delta N_z \cong \frac{V}{g}\frac{\dot\theta}{(Ts+1)} \text{ where } T = \frac{qSC_{L_\alpha}}{m} \quad (9)$$

As a practical matter other assumptions for simplicity may be made. Assume a nominal constant value of $V$, $m$, and $q$ are chosen which then removes three variables simplifying the mechanization. Assuming $V = Kg$, a constant, equation (9) becomes:

$$N_z \cong \frac{K\dot\theta}{T_1 s + 1} \quad (10)$$

Where $T_1$ is a constant chosen to represent $\dfrac{qSC_{L_\alpha}}{m}$     (11)

$\ddot Z = N_z \cos\theta$ by definition. Since normally small climb angles have been assumed:

$$\ddot Z = \frac{K\dot\theta}{T_1 s + 1} \quad (12)$$

Since $\ddot Z$ is vertical earth axis acceleration, $\dot Z$ is vertical earth axis velocity which is the term desired to represent vertical speed. The following expressions may be stated to represent vertical speed. (Using Laplace transform notation).

$$\dot Z = \frac{\ddot Z}{s} \cong \frac{K\dot\theta}{T_1 s + 1} = \frac{K\theta}{s(T_1 s + 1)} \quad (13)$$

The pitch angle terms are approximations and require compensating shaping (lead or lag of the input signal) to represent the effective integration of the aerial vehicle speed characteristics. Therefore, the terms actually used including a gain value will be of the form:

$$K_1 \dot Z, \text{ or } \frac{K_1 \ddot Z}{s}, \text{ or } \frac{K_2 \theta s}{(T_1 s + 1)(T_2 s + 1)}$$

$$\text{or } \frac{K_2 \dot\theta}{(T_1 s + 1)(T_2 s + 1)} \quad (14)$$

As previously stated the shaping device 28 transfer function will vary depending upon which signal is employed. However, if vertical acceleration is the signal employed, the shaping device transfer functions will be:

$\theta c = Mc - M_a + K_1 \ddot Z/s$ for vertical rate:

$\theta c = Mc - M_a + K_1 \dot Z$ for pitch angle $\theta$:

$$\theta c = Mc - M_a + \frac{K_2 \theta s}{(T_1 s + 1)(T_2 s + 1)}$$

for rate of change of pitch angle $\theta$:

$$\theta c = Mc - M_a + \frac{K_2 \dot\theta}{(T_1 s + 1)(T_2 s + 1)}$$

We claim:

1. An apparatus for controlling an aerial vehicle along a predetermined speed altitude path wherein the predetermined speed altitude path comprises a profile representing a desirable aerial vehicle operating relationship between speed and altitude; said apparatus comprising:

a central computer for storing said profile, for producing a first signal representing a specific point along said profile determined from the altitude of the vehicle, and for producing a second signal representing actual serial vehicle speed;

displaying means to visually display the value of said first signal;

first means for comparing and providing the difference in value between said first signal and said second signal to produce a third signal proportional to the difference and sensitive to the direction of the deviation, whereby when the actual aerial vehicle speed is less than the predetermined profile speed a third signal is produced to increase vehicle speed and conversely when the aerial vehicle speed is greater than the predetermined profile speed a third signal is produced to decrease vehicle speed; and second means to visually display said third signal.

2. Apparatus as defined in claim 1 including:

a third means producing a fourth signal which is a mathematical function of aerial vehicle acceleration in the earth coordinate vertical axis;

a summing means to add algebraically said third signal and said fourth signal thereby producing a fifth signal, said fifth signal being responsive to said speed command signal and to vertical acceleration of said vehicle in the earth coordinate vertical axis;

whereby a second rate of change decrease in altitude causes a change in the fifth signal proportional to an increase in aerial vehicle speed, and conversely a second rate of change increase in altitude causes a change in said fifth signal proportional to a decrease in aerial vehicle speed; and a fourth means to visually display said fifth signal.

3. Apparatus as defined in claim 1 including:

a third means producing a fourth signal which is a mathematical function of aerial vehicle velocity in the earth coordinate vertical axis;

a summing means to add algebraically said third signal and said fourth signal thereby producing a fifth signal, said fifth signal being responsive to said speed command signal and to vertical velocity of said vehicle in the earth coordinate vertical axis;

whereby a first rate of change decrease in altitude causes a change in the fifth signal proportional to an increase in aerial vehicle speed, and conversely a first rate of change increase in altitude causes a change in said fifth signal proportional to a decrease in aerial vehicle speed; and a fourth means to visually display said fifth signal.

4. Apparatus as defined in claim 1 including:

a third means producing a fourth signal which is a mathematical function of aerial vehicle pitch attitude angle in the earth coordinate system;

a summing means to add algebraically said third signal and said fourth signal thereby producing a fifth signal, said fifth signal being responsive to said speed command signal and to pitch attitude angle from an inertial reference system;

whereby a first rate of change decrease in altitude causes a change in the fifth signal proportional to an increase in aerial vehicle speed, and conversely a first rate of change increase in altitude causes a change in said fifth signal proportional to a decrease in aerial vehicle speed; and a fourth means to display said fifth signal.

5. Apparatus as defined in claim 1 including:

a third means producing a fourth signal which is a mathematical function of first rate of change of aerial vehicle pitch attitude angle in the earth coordinate system;

a summing means to add algebraically said third signal and said fourth signal thereby producing a fifth signal, said fifth signal being responsive to said speed command signal and to pitch attitude angle rate of change from an inertial reference system;

whereby a second rate of change decrease in altitude causes a change in said fifth signal proportional to an increase in aerial vehicle speed, and conversely a second rate of change increase in altitude causes a change in said fifth signal proportional to a decrease in aerial vehicle speed; and a fourth means to display said fifth signal.

6. The method of controlling flight of an aerial vehicle including:

constructing a speed altitude profile for the aerial vehicle representing optimum performance for the vehicle during flight;

continuously displaying the profile speed denoting changes therein as altitude changes;

storing the profile within a computer;

calculating actual aerial vehicle speed;

comparing the calculated actual vehicle speed with the corresponding profile speed;

displaying the speed error which is the difference between the actual vehicle speed and profile speed;

calculating an anticipation signal based on an inertial reference system;

adding the anticipation signal to the speed error signal so the resulting combination signal is proportional to changes in the vehicle speed; and displaying the combined signal to readily ascertain a change in aircraft pitch thereby altering aircraft speed.

7. The method as defined in claim 6 wherein:

the step of adding is accomplished algebraically.

8. The method as defined in claim 6 wherein:

the anticipation signal is based upon vertical acceleration.

9. The method as defined in claim 6 wherein:

the anticipation signal is based upon vertical velocity.

10. The method as defined in claim 6 wherein:

the anticipation signal is based upon aerial vehicle pitch angle.

11. The method as defined in claim 6 wherein:

the anticipation signal is based upon aerial vehicle rate of change of pitch angle.

* * * * *